(12) United States Patent
Carbone et al.

(10) Patent No.: US 9,362,731 B2
(45) Date of Patent: Jun. 7, 2016

(54) SINGLE-FASTENER MOUNTING PLATE FOR ELECTRICAL OUTLETS

(71) Applicant: Hubbell Incorporated, Shelton, CT (US)

(72) Inventors: Christopher Alan Carbone, Newtown, CT (US); Bart Richard Hogestyn, Oxford, CT (US); Ryan Gene Papageorge, Shelton, CT (US); Thomas Louis Scanzillo, Monroe, CT (US)

(73) Assignee: Hubbell Incorporated, Shelton, CT (US)

( * ) Notice: Subject to any disclaimer, the term of this patent is extended or adjusted under 35 U.S.C. 154(b) by 9 days.

(21) Appl. No.: 14/132,561

(22) Filed: Dec. 18, 2013

(65) Prior Publication Data

US 2015/0171572 A1    Jun. 18, 2015

(51) Int. Cl.
*H01R 13/60* (2006.01)
*H02G 3/18* (2006.01)
*H02G 3/14* (2006.01)
*H01R 13/74* (2006.01)

(52) U.S. Cl.
CPC .................. *H02G 3/185* (2013.01); *H02G 3/14* (2013.01); *H01R 13/74* (2013.01); *Y10T 29/49002* (2015.01)

(58) Field of Classification Search
CPC ......... H02G 3/121; H02G 3/081; H02G 3/14; H02G 3/185; H01R 13/665; H01R 13/73; H01R 13/512; H01R 13/506
USPC ........................................................ 439/539
See application file for complete search history.

(56) References Cited

U.S. PATENT DOCUMENTS

| | | | |
|---|---|---|---|
| 1,992,059 A | | 2/1935 | Despard |
| 3,116,402 A | * | 12/1963 | Drugmand ............... H05B 3/06 219/542 |
| 3,895,227 A | * | 7/1975 | Murray ................. F21V 23/026 362/264 |
| 4,041,238 A | | 8/1977 | Penczak |
| 4,134,636 A | * | 1/1979 | Kleinatland et al. .......... 439/535 |
| 4,591,656 A | | 5/1986 | Mohr |
| 5,073,681 A | * | 12/1991 | Hubben et al. ................... 174/66 |
| 5,285,009 A | | 2/1994 | Bowman et al. |
| 5,362,922 A | | 11/1994 | Whitehead |
| 5,468,908 A | | 11/1995 | Arthur et al. |
| 5,744,750 A | * | 4/1998 | Almond ....................... 174/541 |
| 6,441,304 B1 | | 8/2002 | Currier et al. |
| 6,669,041 B2 | | 12/2003 | Almond |
| 6,750,398 B1 | * | 6/2004 | Richardson ..................... 174/58 |
| 7,048,575 B2 | * | 5/2006 | Kidman ....................... 439/538 |
| 7,259,327 B1 | | 8/2007 | Herth |
| 7,348,487 B2 | | 3/2008 | Drane |
| 7,456,358 B2 | * | 11/2008 | Swiencicki et al. ............ 174/66 |
| 7,479,598 B1 | | 1/2009 | Shotey et al. |
| 8,022,297 B1 | | 9/2011 | Thibault |
| 8,273,998 B2 | | 9/2012 | Drane |
| 8,350,154 B1 | | 1/2013 | Shotey |
| 8,388,371 B2 | | 3/2013 | Gorman |

(Continued)

*Primary Examiner* — Jean F Duverne
(74) *Attorney, Agent, or Firm* — Michael Best & Friedrich, LLP

(57) ABSTRACT

A mounting plate for an electrical outlet includes a central region having a front surface, a rear surface, and an opening for accessing an outlet. A first mounting tab and a second mounting tab extend from the central region at an angle. The mounting plate may be used to attach an outlet to an outlet housing having a wiring compartment and a panel at least partially enclosing the wiring compartment. The panel has a front wall and an opening for receiving an outlet.

27 Claims, 6 Drawing Sheets

(56) References Cited

U.S. PATENT DOCUMENTS 8,835,764 B2 * 9/2014 Seff et al. .................. 174/67
2001/0022728 A1 * 9/2001 Klaus ..................... F21V 21/02
  362/418
2013/0122745 A1 * 5/2013 Soubh .................. H01R 12/724
  439/607.09

* cited by examiner

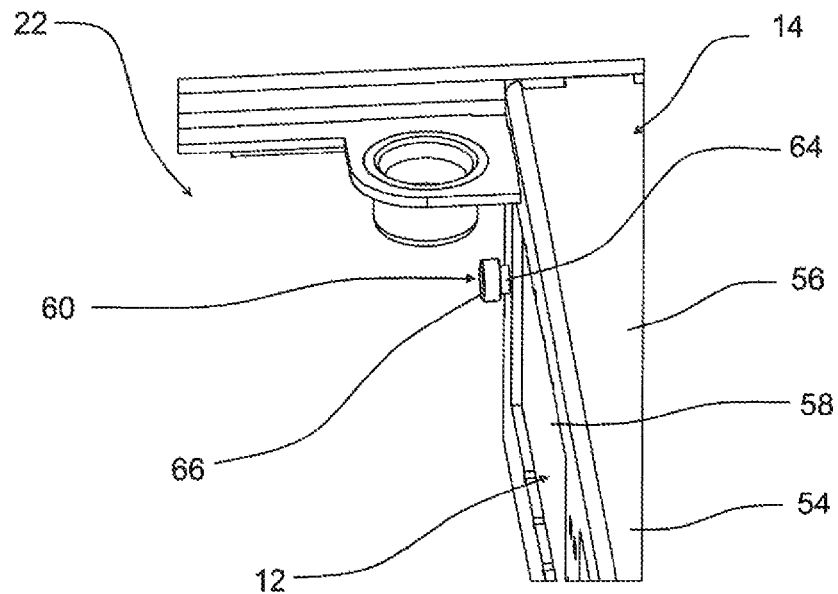
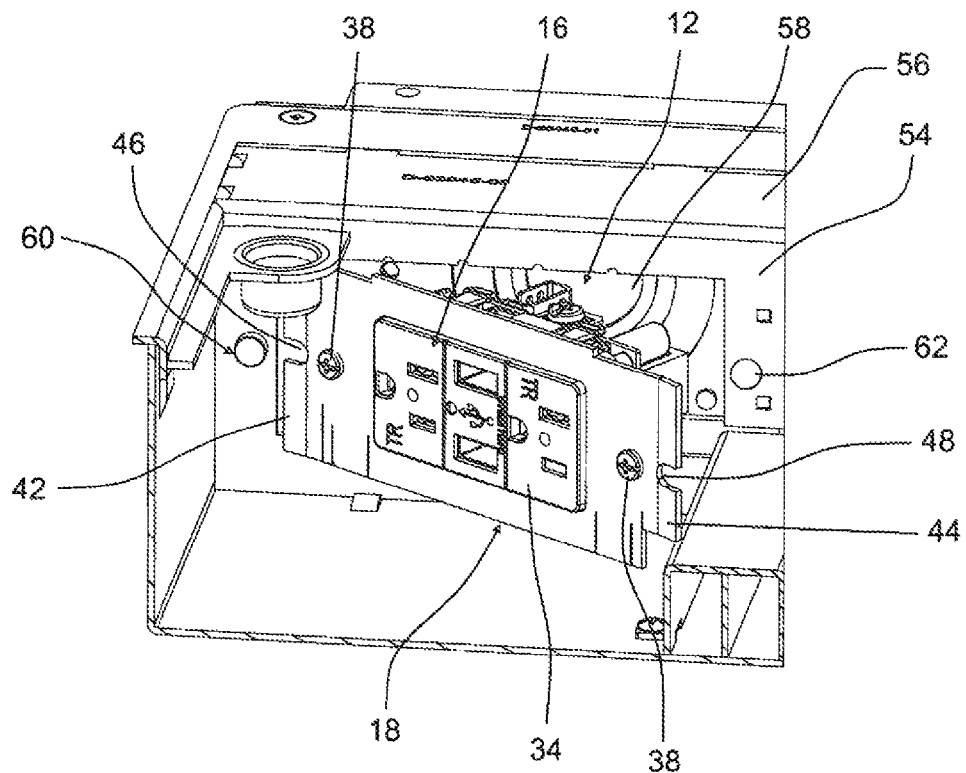

SINGLE-FASTENER MOUNTING PLATE FOR ELECTRICAL OUTLETS

FIELD OF THE INVENTION

The present invention relates to mounting plates for electrical outlets and electrical outlet housings.

BACKGROUND

Mounting assemblies and brackets have been developed for supporting electrical outlets in housings such as in wall electrical boxes. Typically, an outlet is attached to a housing by fasteners placed into a grounding strap. A cover plate or face plate is then attached to the electrical device to cover the open end of the electrical box, hide the grounding straps, and provide a decorative appearance. Face plates are typically attached by one or more screws that extend through a screw hole in the face plate and threadedly engage a threaded bore in the electrical device.

In addition to standard wall mounted outlets, other outlet housings, such as floor boxes, have been developed to provide modular solutions permitting access to multiple electrical, data, and communication outlets. Typical electrical floor boxes have two, four or more wiring compartments around a rectangular or square center access cavity with the same number of face plates. A cover is placed over the access cavity that lies flush, or close to flush, with the floor surface. The wiring compartments are capable of receiving different types of electrical, data, and communication outlets depending on the needs and desires of the user. Accordingly, the outlets are often installed in the wiring compartments after installation of the floor box and the outlets may need to be changed or replaced over time.

Typical prior systems require numerous and sometimes complicated fastening devices for the face plates over the outlets that are time-consuming to install and repair. Typical outlet housings include those described in U.S. Pat. No. 4,041,238 to Penczak titled "Preset Housing for Electrical Distribution Box", U.S. Pat. No. 4,591,656 to Mohr titled "Activation Kits for Pre-sets", U.S. Pat. No. 5,285,009 to Bowman titled "Electrical Floor Box", U.S. Pat. No. 5,362,922 to Whitehead titled "Electrical Floor Box Divider", and U.S. Pat. No. 8,350,154 to Shotey titled "Universal Wall Plate Mount", the disclosures of which are hereby incorporated by reference for their general relevance and are not meant to supersede the description and definitions set forth herein.

SUMMARY

In accordance with an embodiment, a mounting plate for an outlet includes a central region, a first mounting tab, and a second mounting tab. The central region has a front surface, a rear surface, and an opening for accessing an outlet. The first mounting tab extends from the central region at an angle and includes a first slot. A second mounting tab extends from the central region.

In accordance with a further embodiment, a mounting plate for an electrical outlet includes a central region having a front surface, a rear surface, and an opening for accessing an outlet. A first mounting tab and a second mounting tab extend from the central region at an angle.

In accordance with a further embodiment, an outlet housing includes a wiring compartment and a panel at least partially enclosing the wiring compartment. The panel has a front wall and an opening. A mounting feature extends from the front wall. A mounting plate is attached to an outlet. The mounting plate has a slot configured to engage the mounting feature to at least partially retain the mounting plate and the outlet in a position with respect to the panel.

In accordance with another embodiment, a method of positioning an outlet in a housing includes attaching an outlet to a mounting plate. The mounting plate includes a central region, a front surface, a rear surface, and an opening for accessing the outlet. A first mounting tab and a second mounting tab extend from the central region at an angle. The mounting tab includes a first slot and a second slot. The mounting plate is positioned proximate to an outlet housing. The outlet housing has a wiring compartment, a panel at least partially enclosing the wiring compartment, a mounting feature extending from the panel, and a mounting aperture. The first slot is engaged with the mounting feature and a fastener is attached through the second slot and into the mounting aperture.

Other embodiments, including apparatus, systems, methods, and the like which constitute part of the invention, will become more apparent upon reading the following detailed description of the exemplary embodiments and viewing the drawings. It is to be understood that both the foregoing general description and the following detailed description are exemplary and explanatory only and therefore not restrictive.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIG. 6 is a partial perspective view of the outlet housing shown in FIG. 1;

FIG. 7 is a partial perspective view of the outlet housing, outlet, and mounting plate shown in FIG. 1 in a position about to be installed;

DETAILED DESCRIPTION OF EXEMPLARY EMBODIMENT(S) AND EXEMPLARY METHOD(S)

Figure 1:
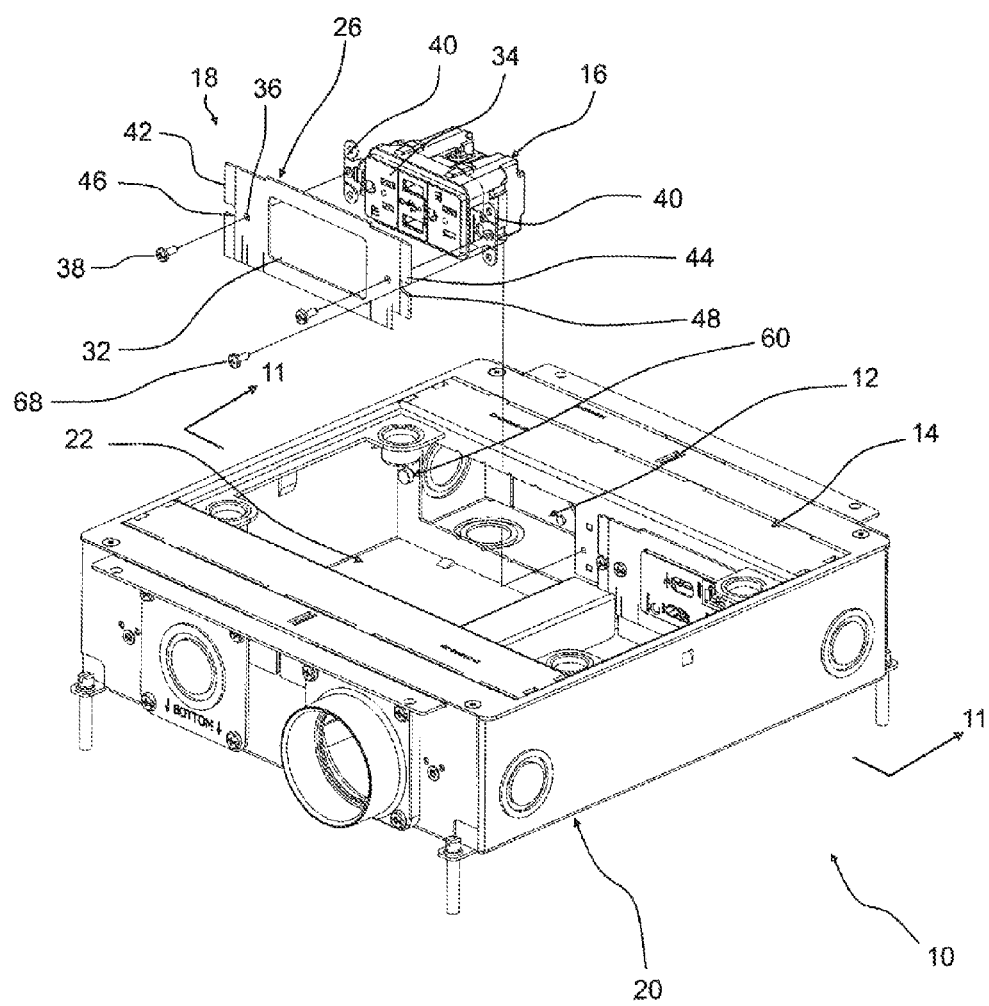
FIG. 1 is a right perspective exploded view of an outlet housing, outlet, and mounting plate according to an exemplary embodiment of the invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

FIG. 1 depicts a horizontally disposed outlet housing 10 having a wiring compartment 12 partially enclosed by a panel 14. An electrical outlet 16 is to be attached to a mounting plate 18. The mounting plate 18 is attached to the panel 14 so that the outlet 16 is positioned in the wiring compartment 12 and extends outwardly therefrom. In the exemplary embodiment shown, the outlet housing 10 is a floor box 20 intended to be recessed in a concrete or raised access floor. The floor box 20 has a main compartment or central cavity 22 allowing a user to access one or more outlets 16 with corresponding electrical cables and plugs or other connectors and/or to work on the floor box 20. The term user may be used in different context herein and shall refer to any person including one who is using, installing, repairing, or performing any operation with or on the outlet housing 10, outlet 16, or mounting plate 18.

The floor box 20 is embedded in the floor with the outlet 16 being accessible to a user through a cover (not shown), the top of which is generally level with the top of the floor. The outlet housing 10 need not be a floor box, and in various alternative embodiments may be any type of outlet box, junction box, recessed housing, poke through, etc.

Figure 2:
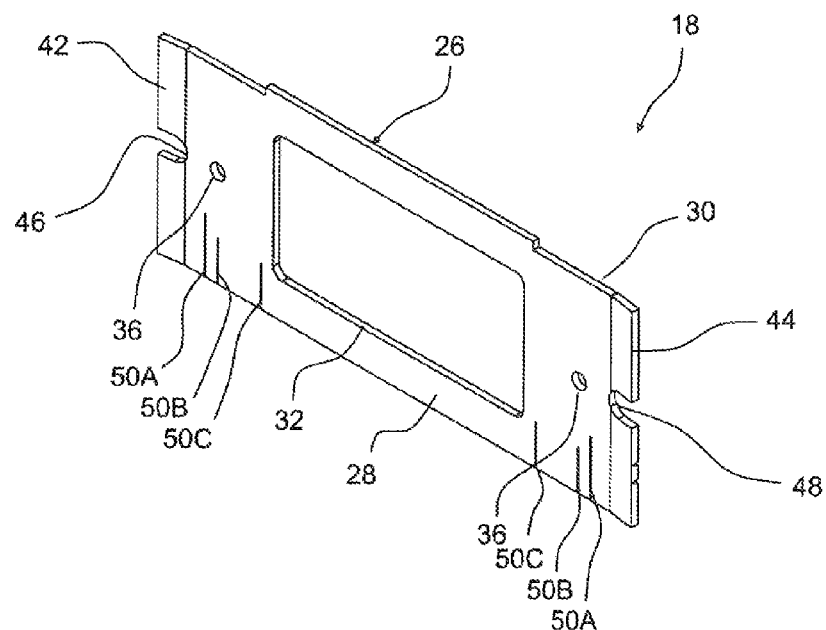
FIG. 2 is an enlarged right perspective view of the mounting plate shown in FIG. 1.
Figure 3:
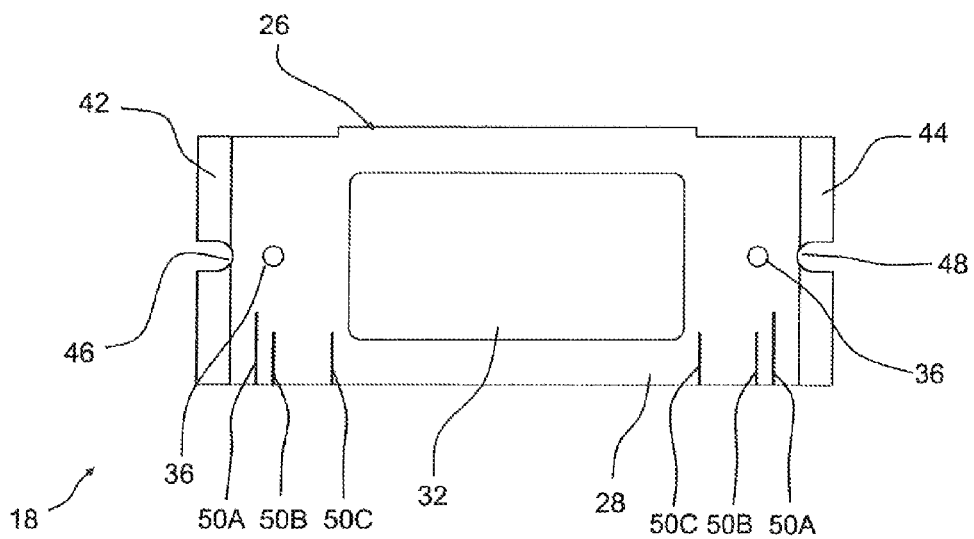
FIG. 3 is a front elevational view of the mounting plate of FIG. 2.
Figure 4:
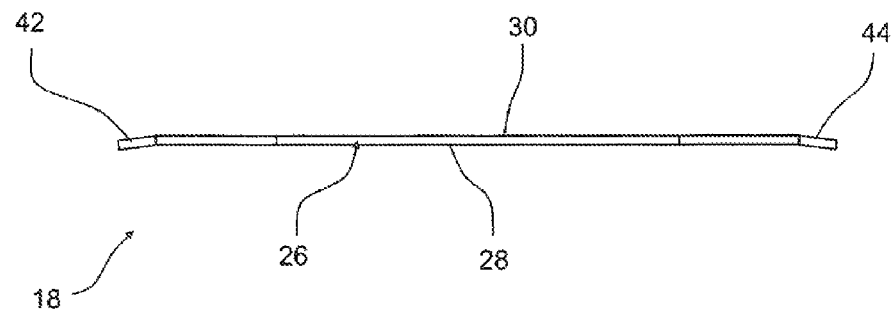
FIG. 4 is a top elevational view of the mounting plate of FIG. 2.
Figure 9:
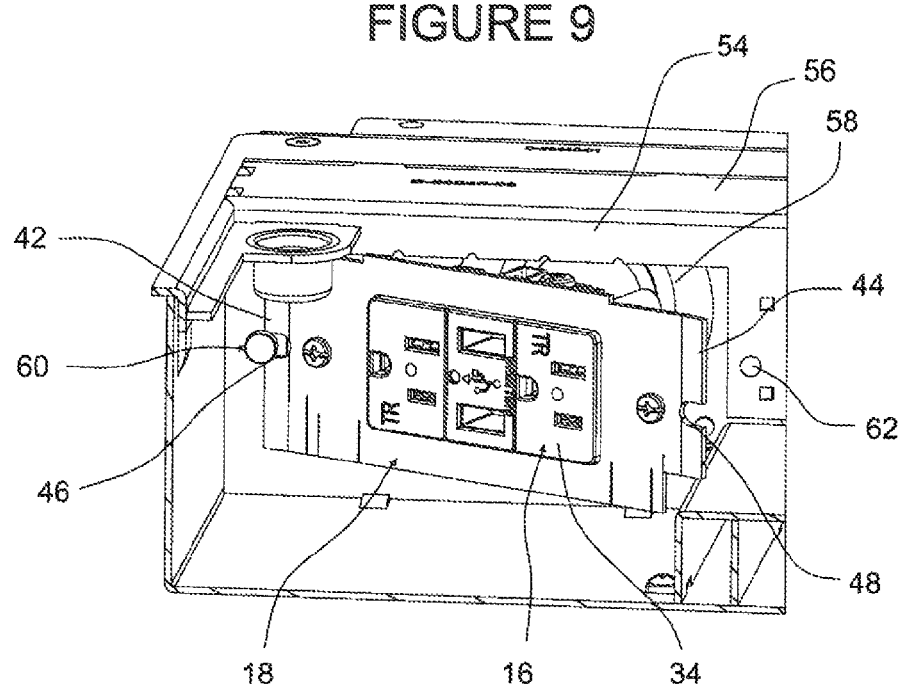
FIG. 9 is a partial perspective view of the outlet housing, outlet, and mounting plate shown in FIG. 1 with the mounting plate about to be coupled to a mounting feature on the housing as in FIG. 8.

As best shown in FIGS. 2-5, the mounting plate 18 includes a central region 26 having a front surface 28 and a rear surface 30. The mounting plate 18 may be made from a resilient material, for example metal or plastic. The front surface 28 is designed to face towards the main compartment 22 while the rear surface 30 faces the panel 14. The central region 26 includes an opening 32 allowing access to an outlet 16. As best shown in FIGS. 2 and 3, the opening 32 has a substantially rectangular shape with rounded corners. As shown in FIGS. 7 and 9, the opening 32 is designed to receive the outlet face 34. The outlet face 34 is shown as extending at least partially through the opening 32, although it may also lie flush with the front surface 28. In various alternative embodiments, the opening 32 may have different shapes and sizes to accommodate different outlets 16. More than one opening 32 may also be provided as necessary.

The central region 26 also includes a pair of fastening apertures 36. The apertures 36 receive fasteners 38, such as threaded fasteners, for attaching the mounting plate 18 to the outlet 16. For example, as best shown in FIG. 1, the fasteners 38 extend through the mounting plate 18 and into the mounting strap 40 of the outlet 16. The fasteners 38, however, may connect to any part of the outlet 16. In various alternative embodiments, one fastening aperture 36 or more than two fastening apertures 36 may be provided depending on the configuration of outlet 16. The fasteners 38 may be mechanical fasteners such as bolts, screws, or a type of interlocking joint. The mounting plate 18 may also be attached to the outlet 16 through adhesives or bonding, or the mounting plate 18 may be formed integrally with the outlet 16.

The mounting plate 18 includes a first mounting tab 42 and a second mounting tab 44. The first and second mounting tabs 42, 44 may extend from opposite ends of the central region 26 oriented horizontally or vertically. In the exemplary embodiment shown, the first mounting tab 42 and the second mounting tab 44 each extend at an angle to the central region 26. The first and second mounting tabs 42, 44 extend at an obtuse angle relative to the front surface 28, the degree of the angle may vary. For example, the first and second mounting tabs 42, 44 may extend at an angle in the approximate range of about 172 to about 174 degrees from the front surface 28. Various exemplary embodiments may utilize mounting tabs 42, 44 without an angle or only a single angled mounting tab. The mounting tabs 42, 44 may be resilient and allow for a certain about of flexure. The mounting tabs 42, 44 are shown as integral with the central region 26, although they may be formed separately and affixed thereto.

The mounting plate 18 also includes a first aperture or open-end slot 46 and a second aperture or open-ended slot 48 at opposite ends of the mounting plate 18. Although first and second slots 46, 48 are shown, a single slot may be used alone or in connection with an aperture or opening. For example, the second slot 48 may be replaced with a circular aperture or other opening. The first and second slots 46, 48 extend into the first and second mounting tabs 42, 44 respectively. In various exemplary embodiments, the first and second slots 46, 48 may extend partially into the first and second mounting tabs 42, 44 or partially into the central region 26.

Figure 5:
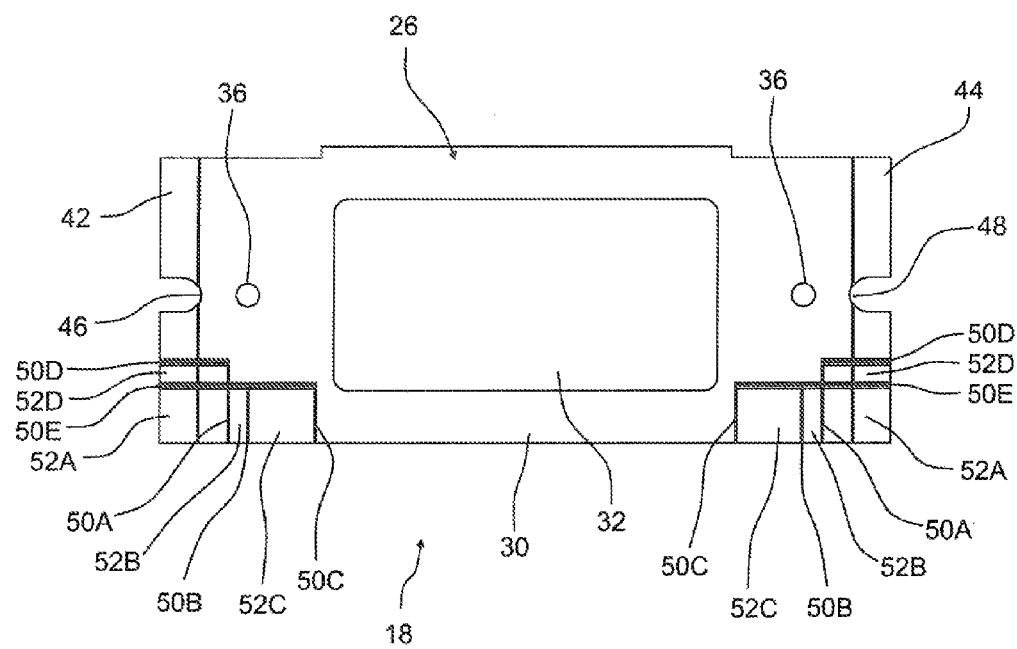
FIG. 5 is a rear elevational view of the mounting plate of FIG. 2.

The mounting plate 18 includes one or more vertical and horizontal score lines 50 defining one or more knockout regions 52. In the exemplary embodiment shown in FIGS. 2 and 3, there are three vertical score lines 50A, 50B, 50C on each side of the front surface 28 and FIG. 5 shows three vertical score lines 50A, 50B, 50C and two horizontal score lines 50D, 50E on each side of the rear surface 30. In the exemplary embodiment shown, four knockout regions 52A, 52B, 52C, 52D are present on each side of the mounting plate 18. The score lines 50 may extend partially into the front and/or rear surfaces 28, 30, through the front and/or rear surfaces 20, 30, or any combination thereof. The score lines 50 reduce the thickness of the mounting plate 18, create areas of structural weakness, and allow a user to easily breakaway and separate the knockout regions 52 from the mounting plate 18 by hand or by using a tool, such as pliers, altering the shape of the mounting plate 18 to fit in different configurations of outlet housings 10.

As best shown in FIGS. 6-11, the mounting plate 18 allows a user to quickly and easily attach and secure and detach the outlet 16 in the floor box 20. The vertical panel 14 of the floor box 20 has a front wall 54 and a top wall 56 partially enclosing the wiring compartment 12. The front wall 54 faces the main compartment 22. In other exemplary configurations the panel 14 may have additional walls including side, bottom, and rear walls. The panel 14 includes a panel opening 58 that provides access to the wiring compartment 12 from the main compartment 22. The panel opening 58 is shown in the front wall 54, although in various exemplary embodiments, the opening 58 may also be placed in other walls, for example the top wall 56. The opening 58 and the wiring compartment 12 are depicted as substantially rectangular in a horizontal orientation, with the long end of the wiring compartment 12 substantially parallel to the bottom of the floor box 20. In an alternative embodiment, the panel opening 58 and the wiring compartment 12 may be oriented substantially vertically, with the long end of the wiring compartment substantially orthogonal to the bottom of the floor box 20.

A mounting feature 60 extends rigidly from the front wall 54 proximate to the opening 58. As best shown in FIGS. 6 and 7, the mounting feature 60 is on the external side of the panel opening 58 proximate to an exterior wall of floor box 20, although it may be positioned on the interior side if desired. A mounting aperture 62 is positioned opposite the mounting feature 60 in the front wall 54. The mounting aperture 62 extends through the front wall 54, although a blind aperture may also be used. The mounting aperture 62 may include threads for threadedly receiving a fastener. In a vertical orientation, the mounting feature 60 could be positioned on the top side or the bottom side of the panel opening 58. The mounting feature 60 may be formed integrally with the front wall 54 or it may be separately attached to the front wall 54 during manufacture or subsequently by a user via a threaded, welded, or other mechanical connection.

In the exemplary embodiment shown, the mounting feature 60 includes a post 64 and a knob 66 extending from the post 64. The post 64 and the knob 66 are both substantially cylindrical, although other shapes may be used. In various exemplary embodiments, the mounting feature 60 may be a mechanical fastener that is attached to the panel 14. The mounting feature 60 is designed to engage with the first or second slot 46, 48 of the mounting plate 18. This description may refer to either the first or second slots 46, 48 interchangeably. The post 64 has a width or diameter sized to fit within the first slot 46 and be slightly smaller. The knob 66 has a width or diameter sized larger than the first slot 46 and acts to retain the mounting plate 18. When the first mounting tab 42 is angled, it will flex to take up a variable amount of space between the base of the knob 66 and the front wall 54. Although a post 64 and a knob 66 are shown and described, the mounting feature 60 may be any structure that is configured to engage the mounting plate 18 and hold it in a desired position or range of positions.

Operation

Outlet housings 10 are not always easily accessible to an installer or a user. For example, when a floor box 20 is recessed into a floor, certain parts of the main compartment are not easily reached or are obstructed by other features. This is especially true where a large number of wiring compartments 16 are placed in a floor box 20 having overall dimensions optimized to be as small as possible. In certain instances, it may be difficult for a user or installer to access, mount, or remove an outlet using traditional mechanical fasteners. These difficulties may be compounded with the need to create versatile outlet housings 10 that can accommodate different outlets 16 and allow a user or installer to easily change one type of outlet 16 for another.

Figure 8:
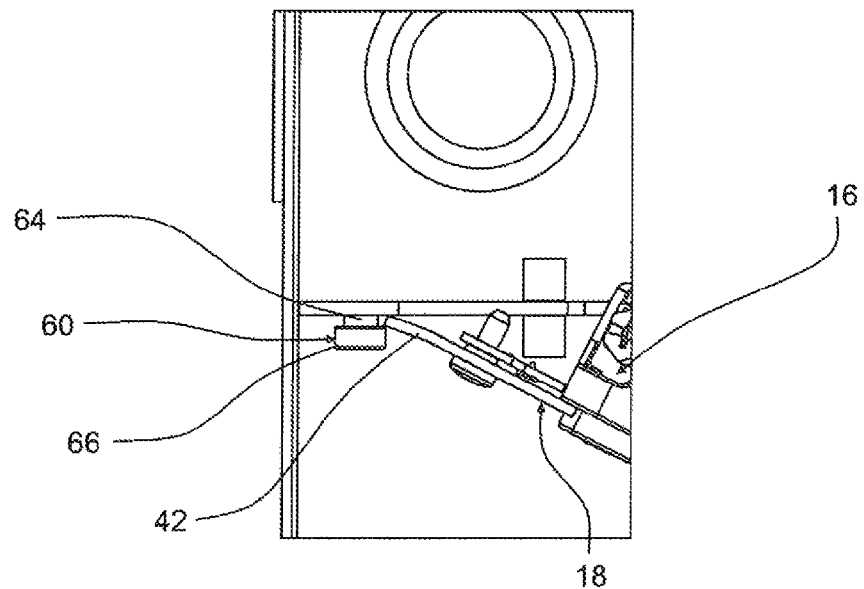
FIG. 8 is a partial top plan view of the outlet housing, outlet, and mounting plate shown in FIG. 1 with the mounting plate about to be coupled to a mounting feature on the housing.

During an installation operation, a user may first detach one or more knockout regions 52 if required by the configuration of the outlet housing 10. The outlet 16 is then attached to the mounting plate 18, for example by the fasteners 38 as shown in FIG. 1. The outlet 16 is then connected to wiring housed in the wiring compartment 12. Alternatively, the outlet 16 may be wired and then connected to the mounting plate 18. As best shown in FIGS. 7 and 8, the mounting plate 18 is initially held on an angle and positioned near the mounting feature 60. The mounting plate 18 is then moved so that the first slot 46 engages the post 64. Positioning the first slot 46 on the post 64 allows a user to easily and quickly align the outlet 16 with the wiring compartment 12 and to secure one side of the mounting plate 18.

Figure 10:
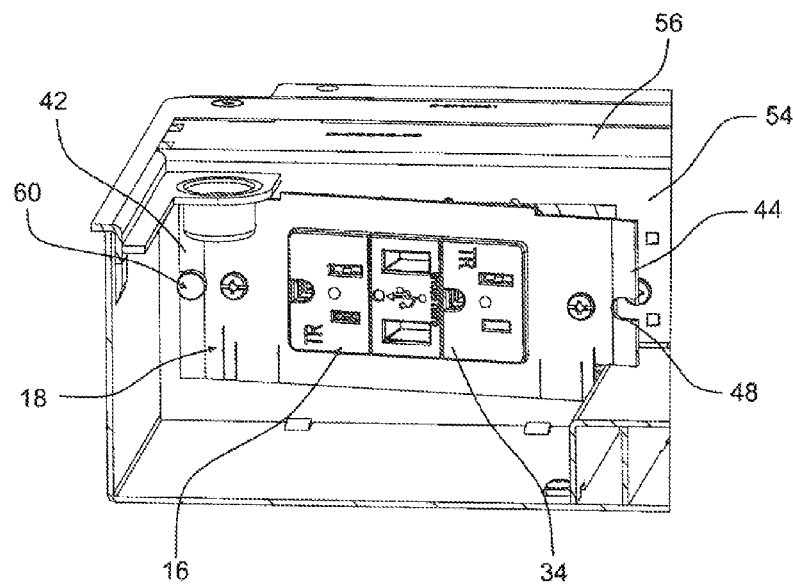
FIG. 10 is a partial perspective view of the outlet housing, outlet, and mounting plate shown in FIG. 1 with the mounting plate coupled to a mounting feature on the housing.
Figure 11:
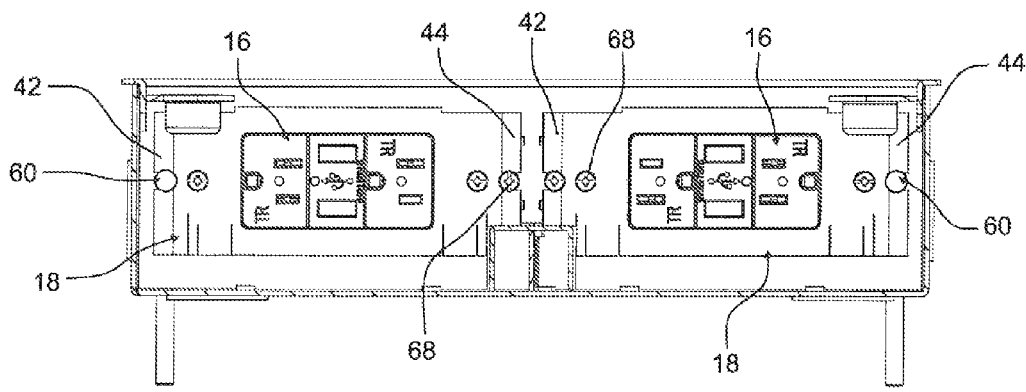
FIG. 11 is a partial, front elevational view in section taken along line 11-11 in FIG. 1 of the outlet housing, outlet, and mounting plate shown in FIG. 1 with the mounting plate secured over the outlet and onto the housing.

As best shown in FIGS. 9 and 10, once the first slot 46 is positioned on the post 64, the user may pivot the other end of the resilient mounting plate 18 towards the front wall 54 and place the rear surface 30 near or into engagement with the front wall 54. The user may then insert a mounting fastener 68 through the second aperture or slot 48 and into the mounting aperture 62, complete the insertion of the fastener 68, and orient the mounting plate against and substantially parallel to the front wall 54. Once the mounting fastener 68 is completely attached to the front wall 54, the outlet 16 is secured in the wiring compartment 12. As discussed above, only a single slot 46 may be used to engage the post 64 and the mounting plate 18 may have a different type of opening, such as a hole with a closed perimeter (not shown) for receiving the mounting fastener 68. By using a single fastener to attach the mounting plate 18, the amount of effort and time needed to install the outlet is reduced and the amount of parts needed is reduced.

When installing the outlet 16, certain areas of the outlet housing 10 may be more easily accessible than others. In the exemplary floor box 20 shown, the interior side of the panel opening 58 is more easily accessible than the exterior side due to placement of additional components. These components may hinder a user from easily attaching a fastener. In such instances, the mounting feature 60 eliminates this problem. In alternative embodiments utilizing a vertical orientation, it may be easier to access the top of the panel opening 58 so the mounting feature 60 may be placed on the bottom of the panel opening 58.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

Only those claims which use the words "means for" are to be interpreted under 35 U.S.C. 112, sixth paragraph.

What is claimed:

1. A mounting plate for an outlet positioned within a housing, the mounting plate comprising:
   a central region having a front surface, a rear surface, and an opening for accessing an outlet;
   a first mounting tab extending from a first end of said central region at an obtuse angle relative to the central region, the first mounting tab having an open-ended slot configured to receive a feature on the housing such that the first mounting tab extends partially around the feature and a portion of the first mounting tab is positioned between the housing and a knob formed on an end of the feature; and
   a second mounting tab extending from said central region, the second mounting tab uniquely configured to receive a fastener that is inserted through the mounting plate and that is removably secured to the housing.

2. The mounting plate of claim 1, wherein said first mounting tab extends from said central region at a first angle and said second mounting tab extends from said central region at a second angle.

3. The mounting plate of claim 1, wherein said first angle is different from said second angle.

4. The mounting plate of claim 2, wherein said first angle and said second angle are in the approximate range of about 172 to about 174 degrees from said front surface.

5. A mounting plate for an outlet positioned within a housing, the mounting plate comprising:
   a central region having a front surface, a rear surface, and an opening for accessing an outlet;
   a first mounting tab extending from said central region at an obtuse angle relative to the central region, the first mounting tab including a first feature configured to engage a second feature positioned on the housing and align the mounting plate relative to the housing; and a second mounting tab extending from said central region, the second mounting tab uniquely configured to receive a fastener that is inserted through the mounting plate and that is removably secured to the housing.

6. The mounting plate of claim 5, wherein the first feature includes a first slot in said first mounting tab and the second feature is a post on the housing, and wherein the second mounting tab includes a second slot for receiving the fastener.

7. The mounting plate of claim 5, wherein said first mounting tab and said second mounting tab extend at obtuse angles with respect to said front surface.

8. The mounting plate of claim 5, further comprising an outlet secured to the mounting plate.

9. The mounting plate of claim 8, wherein said central region comprises an opening for receiving a fastener to secure said outlet.

10. The mounting plate of claim 8, wherein said outlet is selected from the group consisting of an electrical outlet, a data outlet, and a communication outlet.

11. The mounting plate of claim 5, further comprising at least one score line defining a knock-out section, the at least one score line positioned on at least one of the central region, the first mounting tab, and the second mounting tab.

12. The mounting plate of claim 7, wherein said angle of the first mounting tab and an angle of the second mounting tab are in the approximate range of about 172 to about 174 degrees from said front surface.

13. An outlet housing comprising:
a wiring compartment;
a panel at least partially enclosing said wiring compartment having a front wall and an opening;
a mounting feature extending from said front wall, the mounting feature including a post proximate the front wall and a protrusion extending from an end of the post and spaced apart from the front wall;
an outlet; and
a mounting plate attached to said outlet, the mounting plate having a first end and a second end, the first end positioned between the protrusion and the front wall to at least partially retain said mounting plate and said outlet.

14. The outlet housing of claim 13, wherein said post has a first width and the protrusion is a knob having a second width greater than said first width extending from said post.

15. The outlet housing of claim 14, wherein the first end includes a slot receiving the post, the slot having a slot width greater than said first width but less than said second width.

16. The outlet housing of claim 13, wherein said mounting feature is integrally formed with said panel.

17. The outlet housing of claim 13, wherein said mounting feature comprises a mechanical fastener secured to the panel.

18. The outlet housing of claim 13, wherein said mounting plate comprises a central region having an opening for accessing said outlet, a first mounting tab extending from said central region at an angle, and a second mounting tab extending from said central region at an angle, wherein a slot is formed at least partially in said first mounting tab, the slot receiving the post.

19. The outlet housing of claim 18, wherein said mounting plate further comprises at least one score line defining a knock-out section.

20. The outlet housing of claim 13, wherein the mounting plate includes a first slot proximate the first end and receiving the post.

21. The outlet housing of claim 20, wherein said mounting plate further comprises an aperture for receiving a fastener extending through said mounting plate and into said panel.

22. The outlet housing of claim 17, wherein said aperture comprises a second slot proximate the second end.

23. The outlet housing of claim 13, wherein said outlet is selected from the group consisting of an electrical outlet, a data outlet, and a communication outlet.

24. A method of positioning an outlet in a housing comprising the steps of:
attaching an outlet to a mounting plate, the mounting plate having a central region, an opening for accessing said outlet, a first mounting tab extending from said central region at an angle, and a second mounting tab extending from said central region at an angle;
positioning said mounting plate proximate a surface of a panel such that the first mounting tab is positioned between the surface and a mounting feature, the mounting feature extending from said surface;
pivoting said mounting plate to move said second mounting tab toward the panel; and
attaching a fastener through said second mounting tab and into said panel.

25. The method of claim 24, wherein said mounting plate comprises a knockout region and further comprising the step of removing said knockout region from said mounting plate prior to positioning said mounting plate proximate the surface of the panel.

26. The method of claim 24, wherein positioning said mounting plate proximate the surface includes inserting an open slot formed on the first mounting tab around a post, wherein the mounting feature is a protrusion extending outwardly from the post.

27. The method of claim 24, wherein pivoting said mounting plate includes pivoting the second mounting tab about the first mounting tab.

\* \* \* \* \*